3,133,030
LOW CAPACITY SULFONATED CATION EXCHANGER RESINS

Robert M. Wheaton, Midland, and Lawrence E. McMahon, Gladwin, Mich., assignors to The Dow Chemical Company, Midland, Mich., a corporation of Delaware
No Drawing. Filed Aug. 22, 1960, Ser. No. 50,878
2 Claims. (Cl. 260—2.2)

This invention concerns low capacity sulfonated cation exchange resins and their method of preparation.

Sulfonated cation exchange resins having substantially one sulfonate group per aromatic nucleus are well known as conventional cation exchange resins. They are sometimes referred to as fully sulfonated or standard sulfonated cation exchange resins.

It has now been discovered in accordance with this invention that particular partially sulfonated resinous polymers similar to conventional sulfonated cation exchange resins in that the resin matrix or backbone is the same but having sulfonic acid group substitution of from only 10 percent to 60 percent of that required for total monosulfonate substitution of the polymeric aromatic nuclei can be made. These partially sulfonated cation exchange resins have their sulfonate groups uniformly distributed throughout the polymeric matrix and are particularly useful in salting-out chromatography wherein various organic species can be absorbed and separated from their aqueous solutions, e.g., phenols from their aqueous solutions.

Low capacity sulfonated cation exchange resins have been made by desulfonating standard sulfonated cation exchange resins, by sulfonating styrene-chlorostyrene-divinylbenzene copolymers in which the chlorine group blocks some sites to further sulfonation or by copolymerizing p-sulfonamidostyrene and styrene with di-(p-vinylphenyl) sulfone followed by treatment with nitrous acid to convert the sulfonamido groups to sulfonic acid groups.

The method of this invention provides a simpler and less expensive route, gives less side reactions and provides a resinous polymer having uniformly distributed sulfonate groups, without the by-products of prior art methods.

The method of this invention concerns swelling a polymeric alkenylaromatic resin with a swelling agent which is also a solvent for chlorosulfonic acid, admixing chlorosulfonic acid therewith at a temperature below sulfonation temperature, i.e., below $-20°$ C. and slowly heating the mixture of swollen resin and dissolved chlorosulfonic acid to a sulfonation temperature, above $-20°$ C., in acid to polymer ratio sufficient and for a time sufficient to introduce from 10 to 60 percent of the sulfonic acid groups necessary to give a polymeric alkenylaromatic monosulfonate resin. Reaction time is usually from about ½ to about 2 hours at a reaction temperature between about $-20°$ and $20°$ C., and can be determined by following the capacity of the water-washed reaction product. The products of this reaction have a dry weight cation exchange capacity from about 20 to 80 percent that of conventional sulfonated cation exchange resins, and an equilibrium water content in the fully water-swollen state of about 30 to about 80 weight percent. Microscopic examination of the products of this invention shows that sulfonation is uniform throughout the resin particles rather than on the surface alone, as indicated by lack of visible unsulfonated cores and absence of strain in the particles.

Suitable starting resins for making the low capacity sulfonated cation exchange resins of this invention are the conventional polymeric alkenylaromatic resins crosslinked with from about 0.1–10 weight percent of a crosslinking agent copolymerizable therewith containing two nonconjugated vinylidene groups, of the type such as are used in making conventional sulfonated cation exchange resins. These include, for example, resinous polymers of styrene, vinyl toluenes, vinyl xylenes, vinyl naphthalenes, vinyl ethylbenzenes, α-methylstyrene, vinyl chlorobenzenes, vinyl dichlorobenzenes or mixtures thereof, crosslinked with crosslinking agents such as divinylbenzenes, divinyltoluenes, divinylxylenes, divinylnaphthalenes, divinylethylbenzenes, diallyl esters, diacrylate esters, etc.

Suitable swelling agents for the polymeric alkenylaromatic resins are the liquid sulfonation-resistant chlorinated hydrocarbons having a boiling point up to about 120° C., e.g., chloroform, methylene chloride, ethylene dichloride, 1,1,2-trichloroethane, cis-dichloroethylene, trichloroethylene, methyl chloroform, perchloroethylene, carbon tetrachloride, ethylidene dichloride, and the like.

While other sulfonation agents can be used in making conventional sulfonated cation exchange resins, chlorosulfonic acid only can be used in the process of this invention.

In practice, a resinous crosslinked alkenylaromatic polymer in particulate form is mixed with an amount of a liquid chlorinated hydrocarbon swelling agent more than sufficient to give maximum swelling, as determined by a simple trial. The swollen polymer is cooled to below sulfonation temperature, i.e., below $-20°$ C., and sufficient chlorosulfonic acid is added with stirring as would provide a sulfonated polymer having from about 10 to about 60 percent of its available aromatic nuclei sulfonated. The reaction mixture is then permitted to warm slowly above reaction temperature of $-20°$ C. for a reaction time up to about 2 hours. A temperature rise of ½° C. per minute during reaction is suitable.

The reaction mixture is then quenched with water and heated or filtered to remove swelling agent. The water-insoluble partially sulfonated product thereby obtained is in particulate or bead form. It is particularly useful for separating water-soluble phenols from their aqueous solutions. This is a property not associated with standard sulfonated cation exchange resins, which show much lower phenol sorption.

The following examples describe completely specific embodiments of the method and products of this invention and set forth the best mode contemplated by the inventors for carrying out their invention. The examples are descriptive and not limitative of the invention which is defined in the claims.

Example 1

To 500 grams of resinous copolymer beads (prepared from 87 percent styrene, 8 percent divinylbenzene, 5 percent ethyl vinyl benzene by suspension polymerization) was added 1.5 liters of methylene chloride, a considerable portion of which was absorbed by the swelling polymer beads. By use of a dry ice-methylene chloride bath, the mixture of swollen resin beads and swelling agent was cooled to $-60°$ C. at which temperature 140 grams of chlorosulfonic acid was added with stirring. The reaction mixture was then permitted to warm slowly after the last of the Dry Ice had evaporated and finally was held for 2 hours at room temperature, about 20° C.

The reaction mixture was then quenched with water and heated to vaporize methylene chloride. The product solid beads were then filtered and washed free of acid.

Product yield was 875 grams of which 35.7 percent by weight was water. Wet volume capacity (bulk) was 0.93 milliequivalents per milliliter, when titrated with standardized aqueous sodium hydroxide. Dry weight capacity was 1.99 meq./gram. This is about 25 percent sulfonation. In comparison thereto, standard Dowex 50 sulfonate cation exchange resin had a wet volume capacity of 1.78 meq./ml. and a dry weight capacity of 5.11 meq./g.

Microscopic examination of the particles showed that they were uniform, indicating uniform sulfonation throughout the resin rather than on the surface alone.

Example 2

A quantity of 225 grams of 2 weight percent divinylbenzene, 1 percent ethyl vinyl benzene, 97 percent styrene copolymer beads, essentially 50–100 U.S. Standard mesh, was slurried in 1,000 ml. methylene chloride and cooled with Dry Ice to −55° C. A solution of 45 ml. chlorosulfonic acid in 45 ml. methylene chloride was then added and the temperature raised slowly over a period of 1 hour and 55 minutes to 10° C. at which temperature the beads were filtered free of liquid components and washed with methanol. Final product had a dry weight capacity of 1.98 milliequivalent per gram (25 percent sulfonate substitution) and a moisture content of 59.8 percent. Sulfonation was uniform throughout as determined by microscopic examination.

What is claimed is:

1. A method for making water-insoluble uniformly sulfonated resinous alkenylaromatic polymers having from about 10 to about 60 percent of the available aromatic nuclei sulfonated by cooling to below −20° C. a resinous alkenylaromatic polymer crosslinked with about 0.1 to about 10 weight percent, resin basis, of a crosslinking agent having two vinylidene groups, and swollen with a liquid sulfonation-resistant chlorinted hydrocarbon having a boiling point up to about 120° C., mixing therewith chlorosulfonic acid in amount sufficient to provide from 1 to 6 sulfonate groups for each 10 available aromatic nuclei and heating the reaction mixture to a sulfonation temperature within the range −20 to 20° C. for a time sufficient to provide a uniformly and incompletely sulfonated resinous polymeric product, said polymer prior to said sulfonation being free from anionic substituent groups.

2. The process of claim 1 wherein the swelling agent is methylene chloride.

References Cited in the file of this patent

UNITED STATES PATENTS

| | | |
|---|---|---|
| 2,031,929 | Breuers | Feb. 25, 1936 |
| 2,500,149 | Boyer | Mar. 14, 1950 |
| 2,645,621 | D'Alelio | July 14, 1953 |
| 2,764,563 | McMaster | Sept. 25, 1956 |